United States Patent

Abernathy et al.

[15] 3,676,852

[45] July 11, 1972

[54] MULTIPLE PROGRAM DIGITAL COMPUTER

[72] Inventors: Roger E. Abernathy, Boca Raton, Fla.; Nicholas S. Mitrofanoff, Rochester, Mich.

[73] Assignee: International Business Machines Corporation, Armonk, N.Y.

[22] Filed: July 20, 1970

[21] Appl. No.: 57,380

[52] U.S. Cl. ....................340/172.5

[51] Int. Cl. ....................G06f 9/18

[58] Field of Search ....................340/172.5

[56] References Cited

UNITED STATES PATENTS

| | | | |
|---|---|---|---|
| 3,226,694 | 12/1965 | Wise | 340/172.5 |
| 3,380,033 | 4/1968 | Cerny | 340/172.5 |
| 3,564,510 | 2/1971 | Bagley et al. | 340/172.5 |
| 3,079,082 | 2/1963 | Scholten | 340/172.5 |
| 3,143,644 | 8/1964 | Selmer | 340/172.5 |
| 3,245,047 | 4/1966 | Blaauw et al. | 340/172.5 |
| 3,359,544 | 12/1967 | Macon et al. | 340/172.5 |
| 3,373,408 | 3/1968 | Ling | 340/172.5 |
| 3,440,612 | 4/1969 | Womack | 340/172.5 |
| 3,566,357 | 2/1971 | Ling | 340/172.5 |

*Primary Examiner*—Paul J. Henon
*Assistant Examiner*—Sydney R. Chirlin
*Attorney*—Hanifin and Jancin and Keith T. Bleuer

[57] ABSTRACT

A programmed data processor having addressable core storage, a central processing unit having one or more I/O devices connected with it, two sets of program control registers—one for each of two program levels, and a switching mechanism for operating the central processing unit in two different program levels.

11 Claims, 6 Drawing Figures

Patented July 11, 1972 3,676,852

4 Sheets-Sheet 1

INVENTORS
ROGER E. ABERNATHY
NICHOLAS S. MITROFANOFF
BY Keith J. Blue
ATTORNEY

MULTIPLE PROGRAM DIGITAL COMPUTER

BACKGROUND OF THE INVENTION

The invention relates to electronic digital computers and more particularly to such computers which may operate in and in response to a plurality of programs.

Due to the large difference in operating speeds between most input/output (I/O) devices and central computers, programs under which the computers operate have often in the past become I/O bound—that is, the programs cause the computer to wait for additional data with no further instructions being executed and with no productive work being done while waiting for an I/O device to finish its job in bringing in new data or outputting data results.

In the past, one method of increasing the throughput of the computer under these conditions was to have available a second program in core storage capable of operating during the time that a first program was temporarily inoperative while waiting for an I/O device to complete its function. The function of switching from the first program to the second program was under the control of a third program, a so-called supervisor program, which was somehow informed of the need to change program levels. The supervisor program then normally had a housekeeping job to accomplish; and various parts of core storage were used as registers which were then loaded from other locations in core storage representing the contents of the second program to be run in lieu of the first program, while the first program was temporarily inoperative due to the fact that a certain I/O device connected with the first program was temporarily busy.

SUMMARY OF THE INVENTION

It is an object of the present invention to provide an improved processor which has hardware (as distinguished from software or programming) to control the execution of two independent programs so that the processor may be time shared by the two programs, thereby improving utilization of the processor. The dual program concept of the present invention allows two independent object programs to reside in core storage simultaneously, and the capabilities of the two object programs are constrained only by the I/O device configuration and the total storage availability.

When a program becomes I/O bound, processor control is transferred from that program to the other; and this transfer from one program to another may be termed "program level advance." When a program level advance occurs, information relative to program starting and stopping points is an exclusive hardware responsibility and does not require programming attention. This is accomplished by a permanent hardware assignment of an individual set of program control registers to each of the two processor "program levels." Each of these program levels has its own special indicators and controls on the system console thus providing the operator with information and control over the individual programs.

The present invention thus provides in effect a doubling up of the important registers of the machine, in particular, by providing local store or "scratch pad" registers adapted particularly for holding information for a machine cycle or more. These interim storage registers include, for each program level, an instruction address register, an address recall register, indexing registers, and a program status register. The instruction address register contains the address in storage of the instruction which is being executed; the address recall register contains the address in storage to or from which a branch was made; the indexing registers contain values which can be used to develop addresses in storage; and the program status register is one in which various program testable conditions are stored.

The system also has the hardware and ability whereby the I/O devices indicate directly that they are in bound or busy condition and that they are not ready to accept new instructions so that at this time the hardware of the system may cause a change in program level to take place. Changes in program level by the system may be caused by four different conditions. The first one of these conditions is the encounter of a halt instruction in the program instruction stream. This is a software instruction used to communicate with the operator, and the system has a set of visual signals for each program level whereby information can be transferred to the operator. These signals indicate in general that a job has been finished or that a program has recognized the need for some operator intervention.

A change in program level is also caused when a certain I/O device has recognized a start I/O instruction addressed to itself but concludes that it cannot accept this start I/O instruction. The purpose of a start I/O instruction is to command the I/O device to initiate a control operation or a data transfer operation between the I/O device and main storage of the computer. At this time, the I/O device may, for example, be busy or it may have a fault condition requiring operator intervention.

A conditional advance program level instruction, with the condition tested found to be true, also causes a change in program level by the computer. This instruction simply involves the asking of a specific I/O device whether or not the device would be ready to accept a start I/O instruction. This instruction does not actually give the start I/O instruction but merely tests the I/O device to determine if the I/O device is in a condition that the device could accept the start I/O instruction.

An unconditional advance program level instruction will also automatically change the program level. This instruction provides the programmer with the capability to switch the computer from one program level to the other and can be used to share the computer between the two programs even when one of them is a lengthy job with no I/O devices being utilized.

DESCRIPTION OF THE PREFERRED EMBODIMENT

Figure 1:
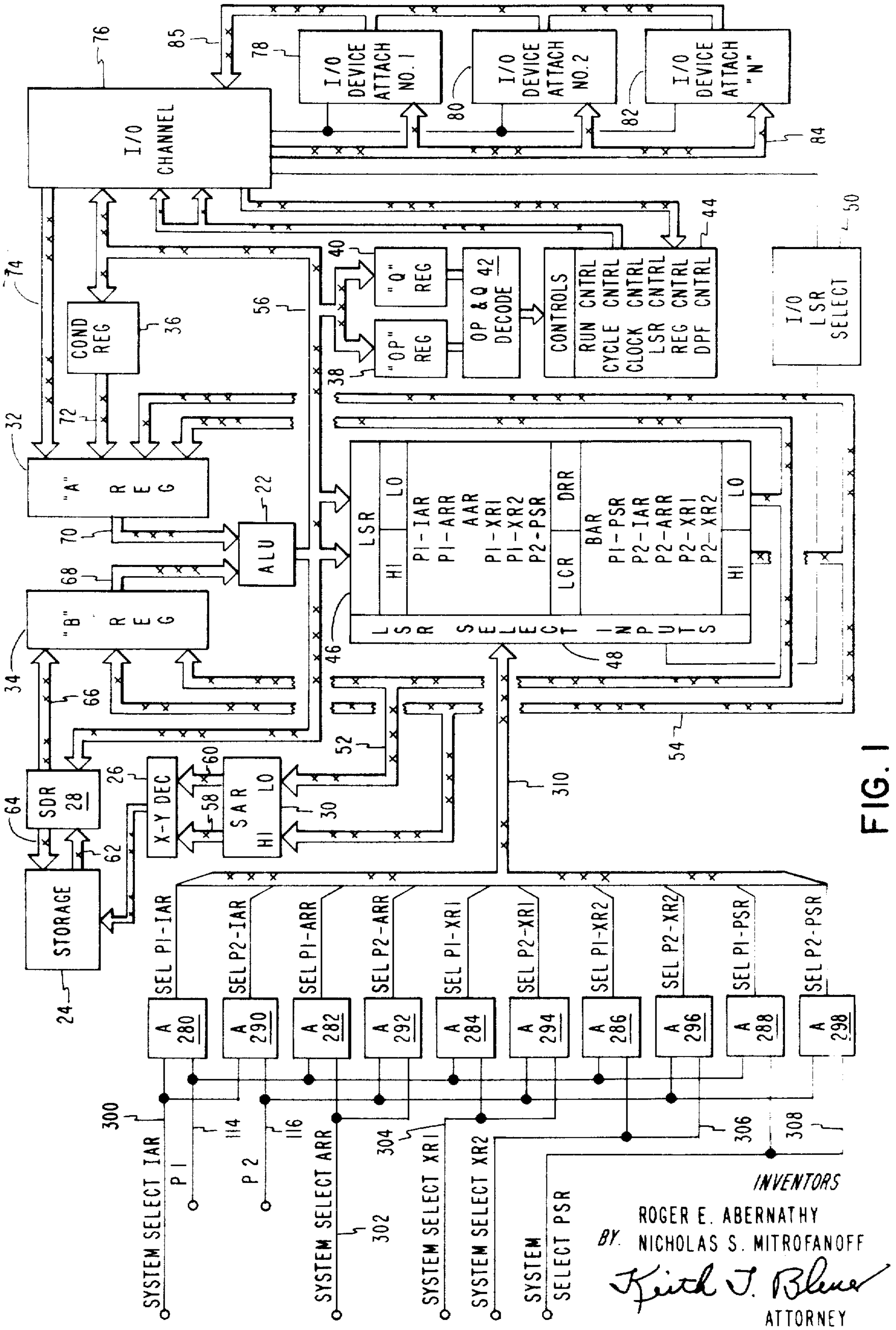
FIG. 1 is a diagrammatic illustration of a central processing unit (CPU) with which the dual program circuitry of the invention may be used, with a portion of this circuitry also being diagrammatically shown in this figure.

Referring to FIG. 1, the central processing unit (CPU) 20 with which the dual program feature is adapted to be used, may be seen to comprise an arithmetic and logic unit (ALU) 22, a storage or memory 24, an X-Y decode logic block 26, a storage data register (SDR) 28, a storage address register (SAR) 30, an "A" register 32, a "B" register 34, a condition register 36, an "Op" register 38, a "Q" register 40, an Op and Q decode logic block 42, controls 44 for the CPU, a set of local store registers 46, an LSR select inputs logic block 48, and an I/O LSR select logic block 50. An LSR data buss out 52 and another LSR data buss out 54 carry data from the LSR registers 46 to the A and B registers 32 and 34 and to the storage address register 30. The ALU 22 has a data buss out 56 through which data is supplied from the ALU to the local store registers 46 and to the SDR 28, to the condition register 36, and to the I/O channel 76. In addition, suitable connections are provided between the CPU 20 and the condition register 36 to store the testable instruction results in the condition register. Other data busses 58 and 60 connect the SAR 30 with the X-Y decode logic 26; data busses 62 and 64 connect the restoring 28 with storage 24; data buss 66 connects the SDR 28 with the B register 34; data busses 68 and 70 respectively connect the A and B registers 32 and 34 with the ALU 22; a data buss 72 connects the condition register 36 with the A register 32; and a data buss 74 constitutes a buss for supplying data from the I/O channel 76 to the A register 32. Suitable connections are provided between the I/O LSR select logic 50 and the LSR select input logic 48, between the Op register 38 and the Q register 40 with the Op and Q decode logic 42 and between the latter and the controls 44 for accomplishing the results to be hereinafter mentioned.

The I/O channel 76 is provided for receiving data and control signals from the CPU 20, and the I/O channel is connected with the data busses 56 and 74 and also by means of control leads with the controls 44. A plurality of I/O device attachments 78, 80, and 82 are connected by means of an input buss 84 and an output buss 85 and also by means of control leads with the I/O channel 76.

The CPU 20 contains the facilities for addressing storage, arithmetic and logical processing of data, sequencing instructions, and controlling the transfer of data between storage 24 and the attached input/output devices 78, 80, and 82. The basic unit of information may be the byte (consisting of eight bits) which represents one alphabetic, numeric, or special character. The storage 24 may, for example, contain 8,192 (8K) positions of core storage to 32,768 (32K) positions or even more. The storage locations may be numbered consecutively (0, 1, 2 . . . ) with each of these numbers corresponding to the address of an individual byte.

Addresses for functions of the CPU 20 are maintained in the local store registers 46 which contain the core addresses necessary for instruction sequencing as well as for data manipulation: both internally and to and from I/O devices 78, 80, and 82. In addition, the LSRs 46 are used as temporary storage for data while the CPU 20 is performing instructions.

Step-by-step data processing is controlled by the Op register 38 which contains the operation for the instruction being performed and the Q register 40 which contains the additional information required to execute the instruction. Calculations within the CPU 20 are performed by the arithmetic and logical unit (ALU) 22, and all data to be processed within the CPU 20 is routed through the ALU 22 which is capable of performing the action required to arrive at the desired result. The CPU 20 has direct control over all the I/O devices 78, 80, and 82; and I/O operations are initiated and tested by program instructions which determine what operation is performed (read, write, etc.).

The registers in the CPU 20 may be grouped into two general categories—the LSRs 46 and the general registers. The general registers are the storage address register 30, the storage data register 28, the B register 34, the A register 32, the condition register 36, the Op register 38, and the Q register 42. The general registers just mentioned are used for storage of information required for periods of a machine cycle or longer while the LSRs 46 are used in general for interim storage of information.

Storage 24 is addressed by a two-byte or 16-bit address contained in the SAR 30, and two bytes are provided to the SAR 30 from a selected local storage register (LSR) 46 each machine cycle to serve as the address.

With respect to the storage data register (SDR) 28, all data which enters to or exits from storage 24 is buffered by the SDR 28 which may constitute a register eight bits in length. Data from the SDR 28 which is intended for the remainder of the CPU 20 is sent to the B register 34.

The B register 34 serves as a one-byte buffer to all the data bytes that are to be modified in the ALU 22 by the contents of the A register 32. Normally, data from the main storage 24 is gated from the SDR 28 into the B register 34 each machine cycle.

With respect to the A register 32, all data which is used to modify the contents of the B register 34 in the ALU 22 is buffered in the A register 32 which is one byte wide. The modifier comes from various sources including the LSRs 46 which act as scratch pad registers or from the condition register 36 or from data buss in 74. For normal address incrementing, output of the LSRs 46 are fed to the B register 34 so that, when required, the addresses contained in the LSRs 46 may be modified by passing them through the ALU 22 while the A register 32 is used to contain the modifier. All data into the CPU 20 from the I/O channel 76 is fed through the A register 32 from buss 74.

The condition register 36 may be up to eight bits wide and is used to store discrete indicators of certain instruction results, and its output is fed to the A register 32 for the purpose of program testing. Loading of the condition register 36 may be from the output of the ALU 22; but, normally, the bits are set individually in the latches of the register by the logic of the CPU 20 as a result of instruction execution.

With respect to the Op register 38, the op codes of the CPU 20 may be eight bits wide and are stored at the beginning of each instruction in the Op register and remain there until the next instruction is fetched. The op codes are sent to the register 38 from storage 24 through the SDR 28, the B register 34, and the ALU 22. The decode of the contents of the Op register 38 is performed by means of the Op and Q decode logic 42 to determine which instruction the machine should execute. When an I/O instruction is decoded by the logic 42, the I/O attachments 78, 80, and 82 receive the information through the channel 76 and the lines connecting the channel and controls 44.

With respect to the Q register 40, each instruction includes a byte known as the Q byte which generally serves to extend or modify the Op code. During the execution of an instruction, the Q byte is stored in the Q register 40; and this register is loaded the same as the Op register 38, and its output is decoded by the logic 42 to determine the necessary additional information for the CPU 20 to execute the instructions. During I/O instructions, The Q register 40 stores the Q byte; but each I/O attachment 78, 80, and 82 also receives the Q byte from the ALU 22 on data buss out 84 at the same time. Each of the I/O attachments is responsible for the interpretation of the Q byte in this case, and the CPU 20 does not use the Q byte of the I/O instruction even though it is stored in the Q register 40.

The local store registers 46 are arranged in a 16-bit register array, with each local store register providing LSR HI and LSR LO data bytes for each of the select lines that are connected with the LSR select input logic 48. The contents of both HI and LO LSRs are available on the output lines contained in busses 52 and 54 when any select line in logic 48 is active. As will be noted, the input to the LSR array comes from the ALU 22 through buss 56; and the output from the LSRs 46 goes to the SAR 30, the B register 34, and the A register 32 through the busses 52 and 54.

In the basic CPU 20, most of the LSRs 46 serve as instruction counters and address registers; but some of them serve as "scratch pad" locations to temporarily store instruction length counts and second operands, and as program status registers. Each I/O attachment (78, 80, or 82) that has cycle steal capability is assigned at least one LSR 46 to retain the address of the location in storage 24 to which it will store data or from which it will receive data, and the selection of the LSR 46 by the attachment is performed through the I/O channel 76. All of these address registers are incremented or decremented by moving the LSR contents through the B register 34 with the appropriate modifier in the A register 32. When the I/O attachment LSR is to be modified, it is the responsibility of the I/O attachment to provide the address modifier through the data buss in 74.

The LSRs 46 include, specifically for a program 1, registers P1–IAR (instruction address register), P1–ARR (address recall register), P1–XR1 (first indexing register), P1–XR2 (second indexing register), and P1–PSR (program status register), and include also corresponding local store registers for a second program level—namely, P2–IAR, P2–ARR, P2–XR1, P2–XR2, and P2–PSR. The local store registers 46 also include local store registers which are used in common for the two program levels—namely, AAR (A address register), BAR (B address register), and LCR-DRR (length count register, data recall register).

The IAR contains the address of the instruction in storage 24 which is being executed. The address stored in this register is incremented ordinarily and is decremented occasionally and is initialized, by means of a hardware function, to zero. A system reset function will initialize this register to zero, or else the initial program load function will put this register at zero value. The address recall register for both program levels is the register that contains the storage address to or from which a branch is made. Both of the indexing registers XR1 and XR2 for both program levels contain a 16-bit value which can be used to develop an address of a location in storage 24 and, in particular, contain a base value to be added to an operand address contained in the instruction stream to develop the effective address of that operand. Both of the PSR registers constitute registers in which the value of the condition register 36 is stored. The P1–PSR contains the value of the condition register 36 for program level 1 and P2–PSR contains the value of the condition register 36 for the second program level. When the program level is changed from program level 1 to program level 2, for example, the contents of the P2–PSR are transferred back into the condition register 36. Similarly, on a change from program level 2 to program level 1, the contents of P1–PSR are transferred back into the condition register 36. The BAR is the B address register wherein is contained the address of the first or B operand which is being acted on by the ALU 22; and the AAR is the same type of register which contains the address of the other operand, the A operand, which is also being operated on by the ALU 22, assuming the particular instruction being executed is of the 2-operand type. The LCR register is an 8-bit register, while the other previously mentioned registers are 16 bits in length, which indicates the length of a field that is being operated on by an instruction. The DRR (data recall register) is an 8-bit register which provides temporary data storage during an instruction. If a two-operand type of instruction, for example, is being executed, one byte of the data, the second or A operand, is stored in the DRR while the next byte of data, the first or B operand, is being obtained so that the two bytes of data may be used simultaneously. It will be noted that the DRR contains eight bits of actual data; and the LCR contains a byte indicating field length, while all of the other local store registers mentioned above contain addresses of locations in storage 24.

The ALU 22 may be of any suitable construction and may perform, in addition to still other functions, the following functions: binary subtract, binary add, logical OR, and logical AND.

Figure 2:
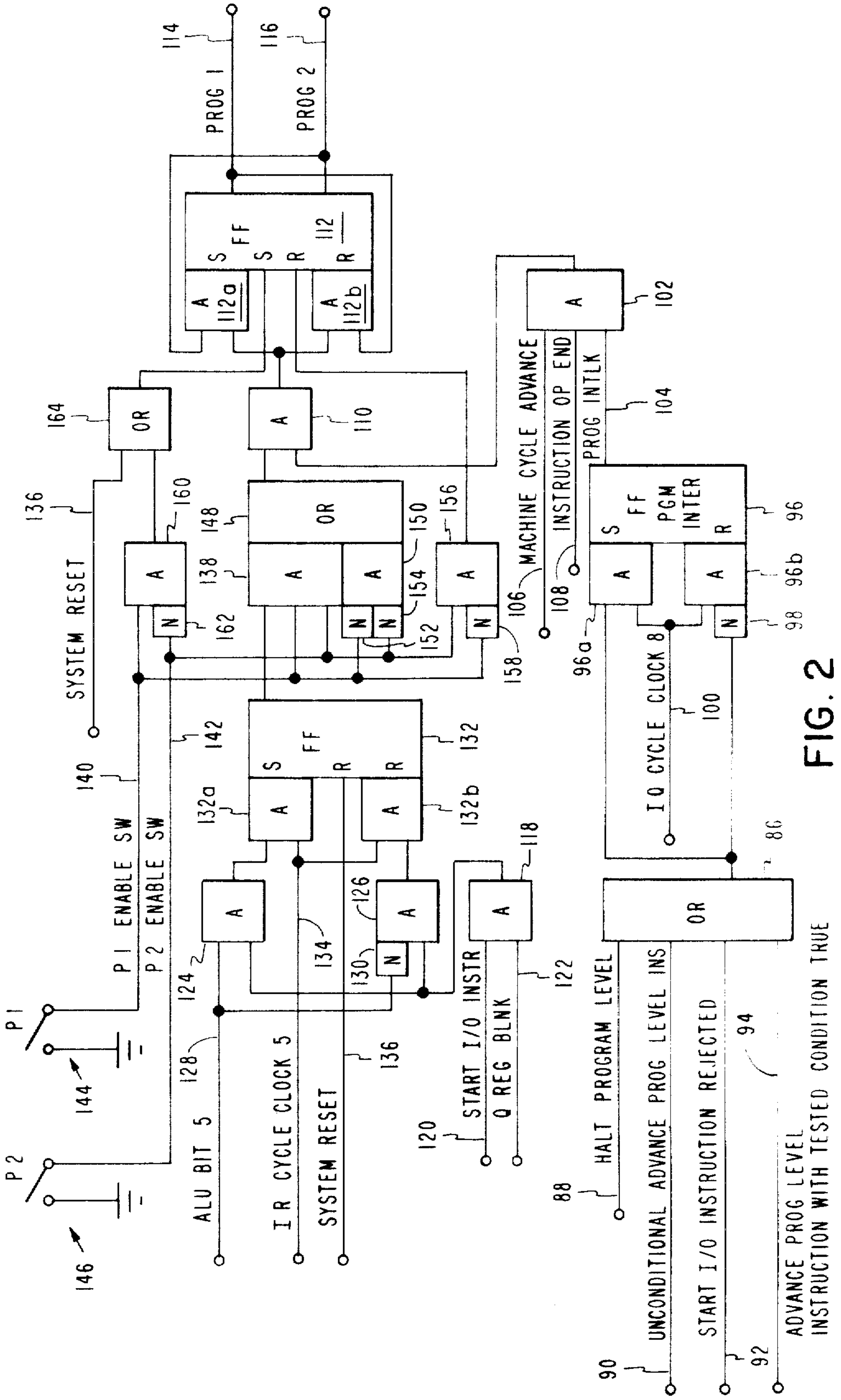
FIGS. 2, 3, and 4 are diagrammatic illustrations of additional portions of this circuitry.

Referring to FIG. 2, the dual program control logic comprises an OR circuit 86 having input leads 88, 90, 92, and 94. The lead 88 carries the signal "halt program level" which will be derived as subsequently explained. The lead 90 carries the signal "unconditional advance program level instruction" and is connected to the Op and Q decode logic 42. The lead 92 carries the signal "start I/O instruction rejected" and is connected to the controls logic 44. The lead 94 is also connected to the controls logic 44 and carries the signal "advance program level instruction with tested condition true." The output of the OR circuit 86 is connected with the set side of a flip flop 96 and is also connected with the reset side of the flip flop by means of an inverter 98. A lead 100 carrying the timing signal "IQ cycle clock 8" is also connected to flip flop 96 as shown. The flip flop 96 includes the AND circuits 96*a* and 96*b*, as shown.

An AND circuit 102 has three inputs, one of which is the lead 104 carrying a "program interlock" signal and constituting the output of flip flop 96. The other two inputs to AND circuit 102 are leads 106 and 108 respectively carrying the signals "machine cycle advance" and "instruction op end." The AND circuit 102 has its output connected to be one of the inputs to an AND circuit 110, and the AND circuit 110 has its output connected as an input to a flip flop 112. The flip flop 112 has two outputs which are respectively leads 114 and 116 carrying the "program 1" and "program 2" signals. The flip flop 112 includes the AND circuits 112*a* and 112*b*, as shown.

An AND circuit 118 has two leads 120 and 122 as inputs respectively carrying the signals "start I/O instruction" and "Q REG blank." AND circuit 118 has its output connected as an input to two AND circuits 124 and 126. The AND circuit 124 also has a lead 128 as an input which carries the signal "ALU bit 5," and lead 128 also constitutes an input to AND circuit 126 by means of inverter 130. The outputs of AND circuits 124 and 126 are respectively applied on the set and reset sides of a flip flop 132, and flip flop 132 also has a lead 134 as an input which carries the signal "IR cycle clock 5" and also has an input in the form of lead 136 carrying the signal "system reset." The flip flop 132 includes the AND circuits 132*a* and 132*b*, as shown.

The output of flip flop 132 is connected as an input to an AND circuit 138, and the AND circuit 138 has two additional inputs in the form of leads 140 and 142 connected respectively to P1 switch 144 and P2 switch 146. The AND circuit 138 is appended as an input to an OR circuit 148, and the output of OR circuit 148 constitutes one of the inputs to AND circuit 110.

Another AND circuit 150 is appended as an input to OR circuit 148, and leads 140 and 142 are connected through inverters 152 and 154 to be inputs to the AND circuit 150. An AND circuit 156 has the lead 142 as an input and also has the lead 140 as an input through an inverter 158, and the output of AND circuit 156 constitutes a reset input to flip flop 112.

An AND circuit 160 has the lead 140 as an input, and also has the lead 142 as an input through an inverter 162. The output of the AND circuit 160 constitutes an input to an OR circuit 164, and the other input to the OR circuit 164 is the "system reset" lead 136. The output of the OR circuit 164 constitutes a set input to flip flop 112.

It will be observed that the lead 116 is connected to the set side of the flip flop 112 through AND circuit 112*a*, and the lead 114 is connected to the reset side of the flip flop 112 through AND circuit 112*b*, with the output of AND circuit 110 being ANDed with leads 114 and 116 as shown.

The lead 114 carrying the "program 1" signal is connected as an input to an AND circuit 166 (see FIG. 3) which is appended on the set side of a latch 168, and the AND circuit 166 has another lead 170 as an input which carries the signal "halt program level instruction." An AND circuit 172 has three inputs in the form of leads 174, 176, and 178 which respectively carry the signals "load register instruction," "IQ cycle," and "clock 8." The output of the AND circuit 172 constitutes one of the two inputs of an AND circuit 180, and the other input to AND circuit 180 is in the form of lead 182 carrying the signal "Q REG bit 2." The output of AND circuit 180 constitutes an input to an OR circuit 184 which is located on the reset side of the latch 168, and OR circuit 184 has another input in the form of lead 186 which carries the signal "key-reset P1 halt." The output of the latch 168 is in the form of a lead 188 carrying the signal "halt latch 1."

The logic above described, including AND circuits 166, 172, and 180, OR circuit 184, and latch 168, constitutes logic usable in connection with the program 1 level, as will be hereinafter more fully explained; and similar logic is provided for the program 2 level and includes corresponding AND circuits 166*a*, 172*a*, 180*a*, OR circuit 184*a*, and latch 168*a* connected together in the same manner as above described with the exception that the lead 116 carrying the "program 2" signal and the lead 190 carrying the signal "key-reset P2 halt" are used in lieu of the leads 114 and 186. This logic, useful in connection with the second program level, has the output lead 192 from the latch 168*a* corresponding to the output lead 188 from the latch 168. The lead 192 carries the signal "halt latch."

The lead 114, carrying the signal "program 1," together with lead 188, constitutes the inputs to an AND circuit 230. The output of AND circuit 230 constitutes the input of OR circuit 232; and the output of OR circuit 232 is lead 88 which, as previously described, constitutes one of the inputs to OR circuit 86. The leads 188 and 114 also constitute two of three inputs to an AND circuit 234, and the third input to AND circuit 234 is the output of an AND circuit 236. The inputs to AND circuit 236 are the lead 176 carrying the signal "IQ cycle" and a lead 238 carrying the signal "clock 5." The two leads 114 and 188 also constitute two of the inputs to AND circuit 240, and the third input of AND circuit 240 constitutes the output of an AND circuit 242. The two inputs to AND circuit 242 are the lead 238 carrying the "clock 5" signal and a lead 244 carrying the signal "IR cycle." The output of the AND circuit 234 is a lead 246 which constitutes the input to a seven-bit latch register 248, and the register 248 also has an input in the form of a buss 250 connected to carry data from the ALU 22. The register 248 has seven outputs; and these are connected to a "stick light" visual indicator 252 having seven lights 254, 256, 258, 260, 262, 264, and 266 arranged in the form of an "8" for indicating the various numerals and certain discrete alphabetics.

The AND circuit 240 has its output in the form of lead 268 which is connected to a seven-bit latch register 248*a* similar to the register 248. The register 248*a* is connected by means of a buss 250*a* with the ALU 22 and is connected with a "stick light" indicator 252*a* which is similar to the indicator 252 but is physically located on the same level and to the right of the indicator 252 for indicating a numeral or alphabetic in the unit's position while the indicator 252*a* indicates a numeral or alphabetic in the 10's position.

AND circuits 270, 272, and 274 are connected with leads 116 and 192 and correspond respectively with AND circuits 230, 234, and 240 while being intended for the second program level while the AND circuits 230, 234, and 240 are intended for use with the first program level. The AND circuits 270, 272, and 274 are connected together and with the leads 116 and 192 in the same manner as the AND circuits 230, 234, and 240 are connected together and with leads 114 and 188. The AND circuit 270 has its output connected to the OR circuit 232 along with the output from AND circuit 230, and the AND circuits 272 and 274 respectively have output leads 276 and 278 connected with latch registers 248*b* and 248*c*. Registers 248*b* and 248*c* are respectively connected with busses 250*b* and 250*c* deriving data from the ALU 22 and have their outputs connected with stick light indicators 252*b* and 252*c* corresponding to the indicators 252 and 252*a* but being used in connection with the second program level rather than the first program level with which the indicators 252 and 252*a* are intended to be used.

The lead 114 carrying the signal "program 1" is connected as one of two inputs to AND circuits 280, 282, 284, 286, and 288 (see FIG. 1). The lead 116 carrying the "program 2" signal is connected as one of the two inputs to AND circuits 290, 292, 294, 296, and 298. The other two inputs to AND circuits 280 and 290 are from a lead 300 carrying the signal "system select IAR;" the other two inputs to AND circuits 282 and 292 are from a lead 302 carrying the signal "system select ARR;" the other two inputs to AND circuits 284 and 294 are from a lead 304 carrying the signal "system select XR1;" the other two inputs to AND circuits 296 and 286 are from a lead 306 carrying the signal "system select XR2;" and the other two inputs to AND circuits 288 and 298 are from a lead 308 carrying the signal "system select PSR." The AND circuits 280, 290, 282, 292, 284, 294, 286, 296, 288, and 298 respectively provide the output signals "select P1-IAR," "select P2-IAR," "select P1-ARR," "select P2-ARR," "select P1-XR1,"b "select P2-XR1," "select P1-XR2," "select P2-XR2,"b "select P1-PSR," and "select P2-PSR;" and the outputs of these AND circuits carrying these signals are connected to a data buss 310 applied to LSR select input logic 48. The logic 48 also has additional inputs (not shown) which are not pertinent to the present invention and which are applicable to some of the LSRs shown and also to other registers that are included in the LSR block 46 but not shown.

Figures 3, 4:
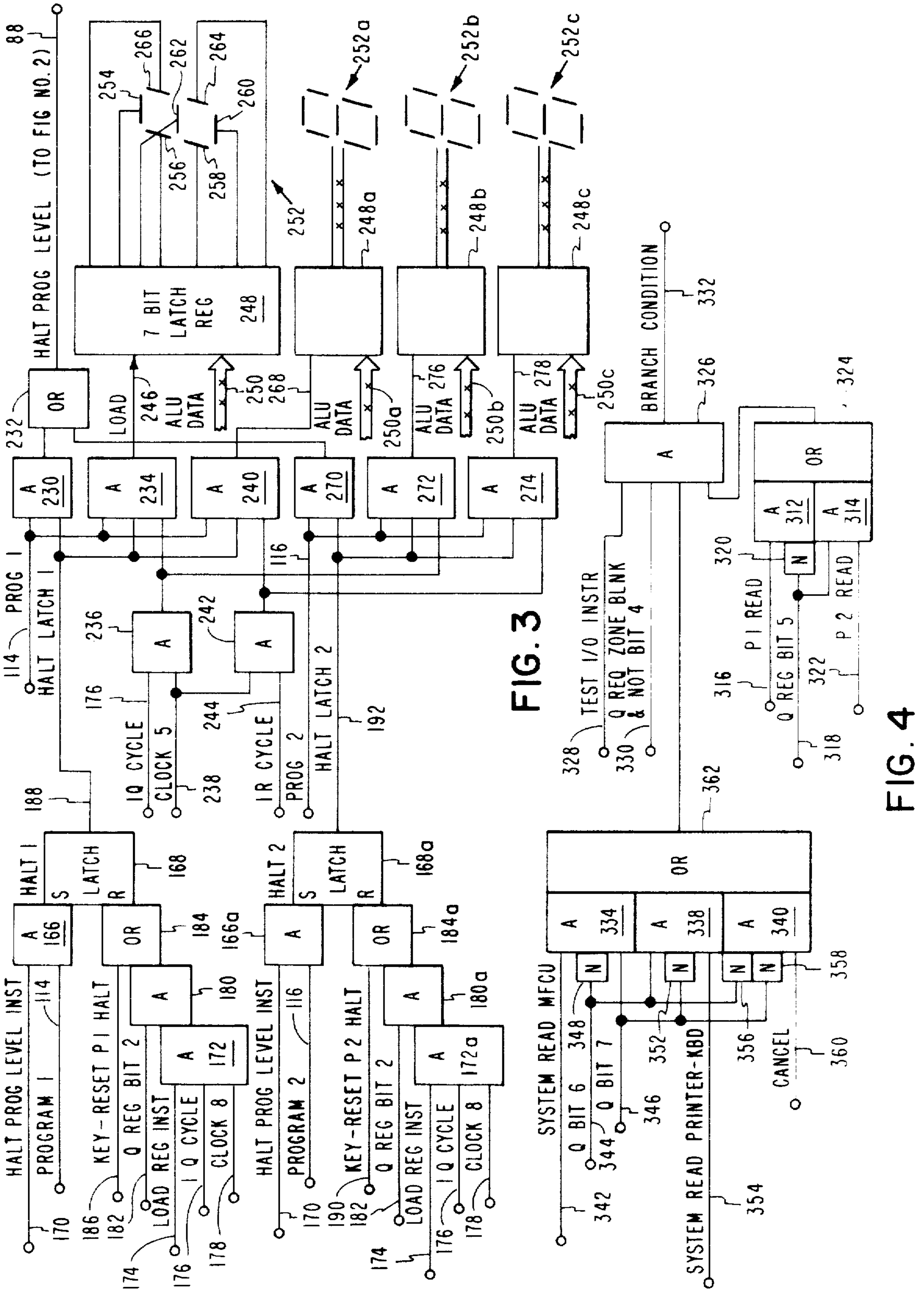

Console switch test logic is illustrated in FIG. 4 and includes AND circuits 312 and 314. AND circuit 312 has the leads 316 and 318 connected thereto as inputs, the connection from lead 318 being through inverter 320. The AND circuit 314 has inputs from leads 318 and 322. The 316 carries the signal "P1 read;" the lead 318 carries the signal "Q REG bit 5," and the lead 322 carries the signal "P2 read." The AND circuits 312 and 314 constitute inputs to an OR circuit 324, and the output of OR circuit 324 constitutes an input to an AND circuit 326. The AND circuit 326 has three other inputs, two of which are leads 328 and 330. The leads 328 and 330 respectively carry the signals "test I/O instruction" and "Q register zone blank and not bit 4." The output of the AND circuit 326 is a lead 332 carrying the signal "branch condition".

This logic also includes AND circuits 334, 338 and 340 (see FIG. 4). The AND circuit 334 has the leads 342, 344, and 346 as inputs; and an inverter 348 is connected in series with the lead 344. The leads 342, 344, and 346 respectively carry the signals "system read MFCU," "Q bit 6," and "Q bit 7." The AND circuit 338 has three inputs, one of which is the lead 344, the second of which is the lead 346 connected by means of an inverter 352 to the AND circuit 338, and the third of which is the lead 354. The lead 354 carries the signal "system read printer-keyboard." The AND circuit 340 has three inputs, the first of which is lead 344 connected through inverter 356 to the AND circuit 340, the second of which is lead 346 connected through inverter 358 with the AND circuit 340, and the third of which is a lead 360 carrying the signal "cancel." The AND circuits 334, 338, and 340 constitute inputs to an OR circuit 362; and the output of OR circuit 362 constitutes an input to AND circuit 326.

The dual program control switch panel includes a rotary program control switch 364 having a dual program control OFF position and two cancel positions, as shown. The switch positions also include a P1 read MFCU position and a P1 read P-KB position, and two corresponding P2 read positions. The switch panel also includes two process lights 368 and 370. The light 368 is for program level 1 and indicates that this program level is active, and the light 370 is for program level 2 and indicates that the second program level is active. The lights 368 and 370 are connected respectively with leads 114 and 116. The switch panel also includes two halt reset keys 372 and 374 which are respectively for program level 1 and program level 2. The two keys 372 and 374 are respectively connected with leads 186 and 190. The switch panel also includes an interrupt key 376, and the key 376 is connected to conventional interrupt logic (not shown) which alerts the program to sense the status of the switch 364.

Figure 6:
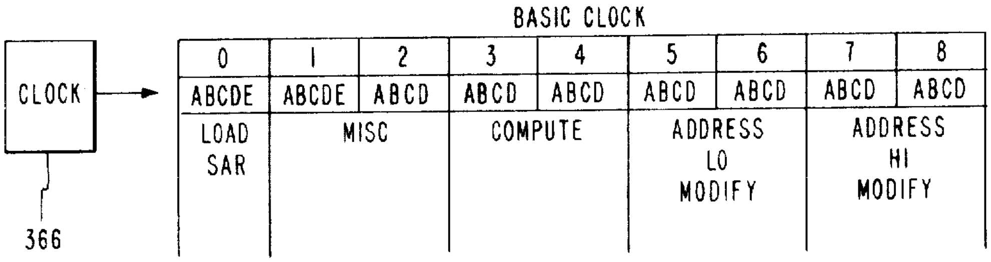
FIG. 6 is a diagrammatic illustration of the clock used in connection with the CPU and dual program circuitry.

FIG. 6 shows the clock 366 which is used for controlling the CPU 20 and the associated apparatus shown in the other figures of the drawings. It will be observed that the basic cycle of the clock 366 is divided into nine parts; and the complete cycle may have a length, for example, of 1.52 microseconds. The various parts 0–8 of the cycle may be used for the various purposes shown in FIG. 6.

In operation, the circuitry above described functions to change the system from program 1 operation to program 2 operation or vice versa in accordance with the change in state particularly of the flip flop 112. When the flip flop 112 is "ON" or energized in positive state, program 1 is active. Under these conditions, the "program 1" signal exists on lead 114; and the flip flop 112 provides no signal on lead 116. When the flip flop 112 is in the opposite condition, the "program 2" signal exists on lead 116 while no signal exists on lead 114. It is apparent that when the "program 1" signal exists, there is no "program 2" signal and vice versa. The inputs to the flip flop 112 from the OR circuit 164 and the AND circuit 156 are the overriding resets to this flip flop; and, therefore, when a "system reset" signal on lead 136 is applied through OR circuit 164 to flip flop 112, the flip flop 112 is set to its program 1 condition. The "system reset" signal on lead 136 is a signal that basically is received at "power on" time for the system or when the operator of the system has decided to cancel all previous work and begin again, the signal being provided under the latter conditions from a suitable switch.

The P1 enable switch 144 and the P2 enable switch 146 may be utilized for controlling the flip flop 112 and thereby for changing the system from a program 1 operation to a program 2 operation. When the P1 enable switch 144 is closed, a signal is thereby provided on lead 140; and, assuming that P2 enable switch 146 is open, the two inputs to the AND circuit 160 are satisfied; and a signal is thereby fed from AND circuit 160 through OR circuit 164 to set flip flop 112 to thereby provide a "program 1" signal on lead 114 with no signal being present on lead 116. To force the P2 mode of operation, the P2 switch 146 is closed, while the P1 switch 144 is opened, to provide a signal on lead 142, with no signal being present on lead 140; and the two inputs of AND circuit 156 are thereby satisfied so as to provide a signal from AND circuit 156 to reset flip flop 112 to thereby provide the "program 2" signal on lead 116 with no signal being present on lead 114. A condition in which advancement of the program level takes place automatically is accomplished when both of the switches 144 and 146 are open; and, under this condition, the two inverters 152 and 154 function to provide the two inputs to AND circuit 150 so as to provide a signal through OR circuit 148 to one of the two inputs of AND circuit 110.

One of the three inputs to AND circuit 102 is from lead 104 carrying the "program interlock" signal which is the major control for the AND circuit 102. The leads 106 and 108 respectively carry the signals "machine cycle advance" and "instruction op end" which constitute timing signals for completing the control of AND circuit 102. The "instruction op end" signal is a signal derived from the CPU indicating that the CPU has reached the end of a particular instruction which is the logical point to terminate either program 1 or program 2. At this time, for instance, a start I/O instruction may have been rejected by the I/O devices—the start I/O instruction is thereby terminated; and this is a logical point for a program level advance. The signal "machine cycle advance" on the lead 106 is simply a timing signal from the CPU 20 indicating the start of a machine cycle at which the circuitry will advance the system to a new program level.

The "program interlock" signal on lead 104 is provided by the program interlock flip flop 96 which is set for this purpose, during the time the OR circuit 86 is satisfied, by the timing signal (IQ cycle clock 8) on lead 100. "IQ cycle clock 8" is a signal derived from clock 366 and controls 44 indicating that the output of OR circuit 86 should be sampled. A "start I/O instruction rejected" signal on lead 92 may, for example, be applied through OR circuit 86 onto the set side of flip flop 96 so that the timing signal on lead 100 will set this flip flop and thereby provide the "program interlock" signal on lead 104. When all of the required inputs to AND circuit 102 are present, the second input on AND circuit 110 is thereby provided; and AND circuit 110, under these conditions, thus changes the state of the flip flop 112 either from a condition in which the "program 1" signal is present on lead 114 or to a condition in which the "program 2" signal is present on lead 116. The lead 92 is connected to the controls logic 44 (FIG. 1), and the signal on this lead exists when a start I/O instruction has been put into the stream of instructions within the CPU and the instruction has been rejected by the particular I/O device addressed.

When the signal "advance program level instruction with tested condition true" is present on lead 94 applied to OR circuit 86, the flip flop 112 is changed in state in the same manner as was the case in connection with the "start I/O instruction rejected" signal on lead 92. Lead 94, like lead 92, is connected to the controls logic 44. The condition tested may, for example, be "Is the I/O device ready?" or "Is the I/O device busy?". The lead 90 is connected to the Op register 38 and is raised when there is an unconditional advance program level instruction in the program stream. This signal on lead 90 has the same effect as the signals on leads 92 and 94 just described to change the program level.

A change in state of the flip flop 112 that determines the program level of the system is also under control of the flip flop 132 which is set by the timing signal on lead 134 if AND circuit 124 is satisfied or is reset by the same signal if AND circuit 126 is satisfied. AND circuits 124 and 126 share one common input developed by AND circuit 118, and AND circuit 118 has the signals "start I/O instruction" on lead 120 and "Q register blank" on lead 122. The leads 120 and 122 are both connected to the Op and Q decode logic 42. The signal "Q register blank," simultaneous with a "start I/O instruction" signal, indicates a command to the program level controls; and the specific information for the controls will be supplied by the signal "ALU bit 5" on lead 128. The signal "ALU bit 5" on lead 128 and the signal "not ALU bit 5" caused by the inverter 130 are respectively applied onto the AND circuits 124 and 126. The lead 128 is connected to the ALU 22, and the signal "ALU bit 5" thus represents a bit of a byte of data from memory as part of this instruction stream. The presence of ALU bit 5 indicates that the program level controls are to be enabled for automatic program level advance. The absence of ALU bit 5 indicates that no automatic program level advance is to be allowed by the program level controls. The flip flop 132 is thus set and reset under control of the AND circuits 124 and 126 during this start I/O instruction by the timing signal on lead 134, and flip flop 132 when active provides a signal to AND circuit 138. The AND circuit 138, assuming that both of the switches 144 and 146 are closed, then has all of its inputs satisfied and provides a signal to flip flop 112 through OR circuit 148; and providing the other input to AND circuit 110 is satisfied as previously mentioned, through AND circuit 110 to change the state of flip flop 112 to provide an advance of the program from the first level to the second level or vice versa. "IR cycle clock 5" is a signal derived from the clock 366 and controls 44 indicating that the ALU contains valid data to be used with a start I/O instruction.

As previously mentioned, one of the two leads 114 and 116 has a signal on it indicating that either P1 or P2, the first or second program level, is active. The "program 1" signal on lead 114 is applied to AND circuit 280 (see FIG. 1), and this AND circuit also has applied to it the signal "system select IAR" which is a signal from the CPU control logic block 44 that indicates that the CPU 20 needs to select an instruction address register in the local store register section 46. The AND circuit 280 thus has both of its inputs satisfied under these conditions and provides a signal "select P1–IAR" through buss 310 to LSR select logic 48 so that the P1–IAR register in the LSR register section 46 is selected for use by the CPU. If the P2 program signal is instead provided on the lead 116, in lieu of the signal on lead 114, the AND circuit 290 will have its inputs satisfied rather than the AND circuit 280; and the signal "select P2–IAR" will be provided through buss 310 to the select logic 48 so as to select the P2–IAR local store register in lieu of the P1–IAR register.

The signals "system select ARR," "system select XR1," "system select XR2," and "system select PSR," likewise indicate that the CPU 20 needs to select an ARR, an XR1, and XR2, or a PSR local store register to function; and the AND circuits 282, 284, 286, and 288, being all connected with the lead 114, cause one of the P1–ARR, P1–XR1, P1–XR2, or P1–PSR local store registers to be selected for use by the CPU when the "program 1" signal on lead 114 and any of the signals on leads 302, 304, 306, and 308 exists. The AND circuits 292, 294, 296, and 298 likewise function similarly to the AND circuit 290 when the "program 2" signal is on lead 116 to select the P2–ARR, P2–XR1, P2–XR2, and P2–PSR local store registers for use by the CPU 20.

A halt instruction is effective when encountered in the instruction stream to provide the signal "halt program level instruction" on lead 170 effective on AND circuit 166 (see FIG. 3). The "halt program level instruction" on lead 170 is an output of the Op and Q decode logic 42. It is assumed that the system is operating in program level 1; and, therefore, the signal "program 1" is on lead 114. The inputs of AND circuit 166 are thus satisfied; and, therefore, it provides a signal to the set side of the "halt 1" latch 168 so that this latch provides the "halt latch 1" signal on lead 188. The function of latch 168 is to store the halt instruction until such time as the operator may recognize and manually reset this latch 168. Inasmuch as the "program 1" signal is on lead 114, the AND circuit 230 has both of its inputs satisfied so as to provide the signal "halt program level" on lead 88 through OR circuit 232. This signal is applied onto OR circuit 86 (see FIG. 2); and, like the other signals such as "unconditional advance program level instruction" on lead 90, also applied at times to OR circuit 86, the signal on lead 88 results in a setting of program interlock flip flop 96 and in an ultimate setting of the flip flop 112 so as to change the level of operation from program level 1 to program level 2. Thus, when the CPU 20 encounters a halt in program level 1, the flip flop 112 changes state resulting in an advance to program level 2.

AND circuit 166*a* and latch 168*a* (see FIG. 3) correspond respectively with AND circuit 166 and latch 168 but are instead operative under program level 2 conditions; and when the "program 2" signal is on lead 116 and when the "halt program level instruction" signal is on lead 170, the AND circuit 166*a* has its inputs satisfied and sets latch 168*a* so as to provide the "halt latch 2" signal on lead 192. AND circuit 270 then has its inputs satisfied since the "program 2" signal on lead 116 exists, and AND circuit 270 thus provides the "halt program level" signal on lead 88 through AND circuit 232 for changing the state of latch 112 as previously described; and latch 112 in this case changes the operation from program level 2 to program level 1.

The "halt 1" latch 168 may be reset due to the actuation of the P1 halt reset key providing a signal on lead 186 that passes through OR circuit 184 to the reset side of latch 168. The latch 168 may also be reset when the signals "Q REG bit 2" on lead 182, the "load REG instruction" on lead 174, the "IQ cycle" on lead 176, and the "clock 8" signal on lead 178 occur simultaneously. The lead 182 is connected with the Q register 40; the signal "load register instruction" on lead 174 is an output of the Op and Q decode block 42; the signal "IQ cycle" on lead 176 is derived from the controls block 44; and the "clock 8" signal is a timing signal out of the basic CPU clock 366. The coincidence of these four signals indicates that the P1-IAR is being loaded by the other program level. Since a new instruction address is being loaded, any halt which may have been previously given is and should be cancelled at this time.

It will be noted that the latch 168*a* is reset substantially in the same manner as the latch 168—namely, when there is a correspondence of the signals "Q REG bit 2," "load register instruction," "IQ cycle," and "clock 8" respectively on leads 182, 174, 176, and 178; and, in addition, the signal "key-reset P2 halt" is effective through OR circuit 184*a* similarly as the "key-reset P1 halt" signal is effective through OR circuit 184 in the program 1 logic.

When a halt instruction is first encountered in the operation stream, the halt indicator registers 248 and 248*a* and the corresponding visual indicators 252 and 252*a* are set. The AND circuit 234 is effective with respect to the register 248 and indicator 252, and the AND circuit 240 is effective for the register 248*a* and the indicator 232*a*. The signals "IQ cycle" on lead 176 and "clock 5" on lead 238 are effective on AND circuit 236, and the output of this circuit is applied as an input to AND circuit 234 along with the signals "program 1" and "halt latch 1" on leads 114 and 188. Therefore, during the IQ cycle of a halt instruction, AND circuit 234 is satisfied; and, therefore, at this time a byte of data from main storage 24 is loaded into the seven-bit latch register 248 by means of buss 250. This particular Q byte of data thus causes the proper lights 254, 256, 258, 260, 262, 264, and 266 to be illuminated. During the next cycle, the IR cycle, of the halt instruction which is applied as a signal by means of lead 244 onto AND circuit 242, the AND circuit 240 is satisfied; and at this time, a byte of data from main storage 24 is loaded into register 248*a* thus causing the proper lights of the indicator 252*a* to be illuminated. Thus, the visual indicator 252 in the unit's position and the indicator 252*a* in the 10's position have been energized to indicate particular numerals or alphabetics. The display is controlled completely by the program software.

The AND circuits 272 and 274 which both have the "halt latch 2" signal on lead 192 as inputs function in the same manner with respect to the visual indicators 252*b* and 252*c* as the AND circuits 234 and 240 function with respect to the visual indicators 252 and 252*a*, but the AND circuits 272 and 274 and the visual indicators 252*b* and 252*c* are effective when program level 2 is in effect.

The logic shown on FIG. 4 is for the purpose of testing or sensing the position of the dual program control switch 364. The position of the switch 364 is sensed by means of a Test I/O (TIO) instruction. If the condition for which the test is made is present in the switch 364—that is, if for example the switch indicates the MFCU for a particular test being made—in this case, the program will branch to the address indicated by the TIO instruction. Conversely, if the condition tested for is not present, the program will not branch to the address specified in the TIO instruction, but will instead proceed to the next sequential instruction. This branching is actually a branch within a particular program level and does not consist of a change from program level 1 to program level 2 or vice versa. The AND circuit 326 is the circuit that is controlled in this logic; and when all of its inputs are satisfied, it produces the signal "branch condition" on lead 332. This lead 332 is applied to the controls logic 44 for the purpose of causing the branch to take place when the signal "branch condition" is raised.

Figure 5:
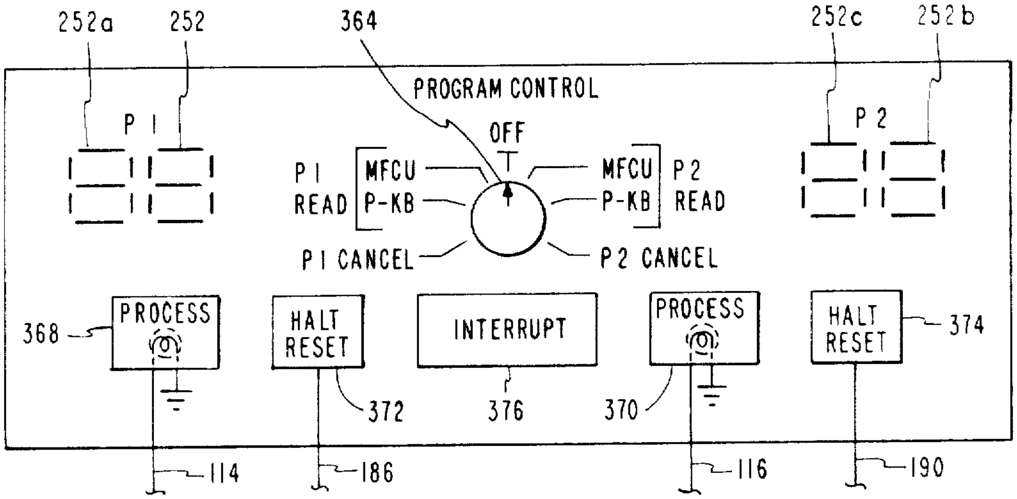
FIG. 5 is a view of the control console used with this circuitry.

The logic shown in FIG. 4 utilizes the signals previously mentioned and which will now be more particularly described. The signal "test I/O instruction" on lead 328 is an output of the decode logic block 42 and indicates that a test I/O instruction has been encountered in the instruction stream. The signal "Q register zone blank & not bit 4" refers to the program control switch 364, and the lead 330 carrying this signal is an output of the decode block 42. The lead 316 is connected with the switch 364; and the signal "P1 read," when raised, indicates that the switch 364 is in one of its three positions associated with program level 1. These are "MFCU," "P-KB," and "cancel." Referring to FIG. 5 showing switch 364, the switch position P-KB refers to a printer-keyboard which might be used with the system; and the MFCU switch position refers to a "multifunction card unit" which is an I/O device that may be used with the system. If switch 364 is in OFF position, sensing of the program control switch 364 will not result in an instruction branch. The lead 318 is an output of the Q register 40; if the Q register bit 5 is present, then the switch 364 is being tested for a P2 read position. Conversely, if the Q REG bit 5 is not present, switch 364 is being tested for a P1 read position. The lead 322 is connected with the switch 364 and has the signal "P2 read" raised on it when the switch 364 is in one of its three positions associated with program level 2. The lead 342 is also connected with the switch 364 and indicates that the switch 364 is in one of its two MFCU positions for either program level 1 or for program level 2. The "system read printer-keyboard" signal on lead 354 indicates that the source of input will be the printer-keyboard, and the lead 354 is connected to the switch 364 and carries a signal when the switch 364 is in either of the two positions labeled P-KB. Lead 360 is connected with the switch 364, and the "cancel" signal on lead 360 indicates that the switch is in one of the two "cancel" positions indicated on FIG. 5. The leads 344 and 346 are outputs of Q register 40. The presence of Q REG bit 6 indicates that switch 364 is to be tested for the P-KB position; the presence of Q REG bit 7 indicates that switch 364 is to be tested for the MFCU position. The absence of both Q REG bits 6 and 7 indicates that switch 364 is to be tested for the cancel position.

The AND circuit 326 which produces the "branch condition" signal on lead 332, as previously described, has the four inputs from leads 328, 330, and OR circuits 324 and 362. The signal "test I/O instruction" 328 to AND circuit 326 indicates that the program is indeed testing for some I/O condition. The signal "Q REG zone blank & not bit 4" 330 applied to AND circuit 326, indicates that the I/O device being tested is the program control switch 364 seen on FIG. 5.

Another input to the AND circuit 326 is from the combination of the two AND circuits 312 and 314 and the OR circuit 324. This input is provided under two conditions, one being when the switch 364 is in the P2 position and the signal "Q bit 5" is raised. OR circuit 324 is likewise effective to supply this input to the AND circuit 326 under the conditions in which the switch 364 is in one of its P1 positions at a time when the "Q bit 5" signal is not raised.

The remaining input to the AND circuit 326 is from the OR circuit 362; and any one of the AND circuits 334, 338, and 340 may apply a signal to OR circuit 362 for the purpose of providing a signal from the latter to the AND circuit 326. Under the condition in which the signal "Q bit 7" does not exist while the signal "Q bit 6" is raised and while the "system read printer-keyboard" signal on lead 354 is raised, AND circuit 338 has its inputs satisfied to feed the OR circuit 362 and condition AND circuit 326 to enable the dual program branch condition. The AND circuit 340 is effective for the same purpose as just mentioned for AND circuit 338 when both the signals "Q bit 6" and "Q bit 7" are not raised and when the switch 364 is in one of its "cancel" positions. The AND circuit 334 is effective for the same purpose as AND circuits 338 and 340 as just mentioned; and AND circuit 334 is effective when the "Q bit 6" signal does not exist, while the "Q bit 7" signal does exist, and while the "system read MFCU" signal on lead 342 exists.

The switch 364 allows the operator of the computer to cause a change in the functioning of the computer and is used in conjunction with the interrupt key 376. When the operator wishes to change the functioning of the computer, he does so by setting the switch 364 and then actuating the interrupt key 376. The interrupt key 376 when actuated, alerts the computer to test, by means of a program resident in the computer, using the TIO instruction in the program, the position of the switch 364.

In the OFF position of the switch 364, no program branch occurs on a TIO instruction. If the control switch is put into one of its P-KB positions, nothing immediately occurs until the interrupt key is actuated and a TIO instruction occurs. The switch 364 has been sampled at this time by the above-described circuitry shown in FIG. 5; and the computer is now apprised of the fact that the operator wishes to load a program and that the information will come from the printer-keyboard. Assuming that the switch 364 has been put into its P1 read P-KB position, the P1 indicators 252 and **252*a* will indicate to the operator that he may or may not go ahead to utilize the keyboard to furnish further information to the computer. Assuming that the indicators 252 and 252*a* indicate that the operator is free to proceed, a plurality of keys will be depressed on the printer-keyboard; and the succeeding events in the computer then depend on the program. In particular, the contents of the program in the computer determine the meaning of the keyed information. This keying may, for example, indicate that a program on a disk is to be utilized under control of program level 1; and under these conditions, the program then goes to the disk and obtains the desired program from the disk and begins operating on this program under program level 1**.

The functioning of the switch 364 in either of its MFCU positions may indicate for example that a document card is to be read from the associated multifunction card unit (MFCU). With the switch 364 being moved into a MFCU read position, nothing occurs until the interrupt key 376 is actuated and a TIO instruction occurs which functions to sense the position of switch 364. Once the position of switch 364 is sensed, determining that it is in an MFCU read position, a branch occurs into a program or routine that will direct that a document card shall be read by the MFCU as a first step and that the meaning of the card shall be interpreted as a second step. If the switch 364 is in a cancel position, it indicates that the operator wishes a program in a particular program level to be cancelled. If the operator wishes to cancel the program in program level 1, he puts the switch 364 into its P1 read cancel position; and on the other hand, if he wishes to cancel the program in program level 2, he moves the switch 364 to its P2 cancel position. Conceivably, the computer may refuse to cancel the program level for some reason and will so tell the operator via the indicators 252 and **252*a* or the indicators 252*b* and 252*c* depending on whether the switch 476 is in P1 cancel or P2** cancel position.

According to a predetermined code, the indicators **252–252*c* may indicate that the operator must wait to cancel the particular program level; or, on the other hand, for example, the indicators 252–252*c*** may indicate that the requested program has been cancelled and that the operator may take the next step.

It is, of course, possible that the position of the switch 364 can be tested at any time as desired by writing this direction into a program; however, the present construction with the interrupt key 376 shall be used, instead, and in conjunction with a TIO instruction in a program, to determine where the rotary switch 364 is positioned. The operator is thus under full control of the situation by virtue of the computer program and the switch 364 which determine what action the computer shall take after the interrupt key 376 is actuated.

If desired, the construction of the ALU 22 may take the form as is described in the co-pending application of Nicholas S. Mitrofanoff, Ser. No. 832,684, filed July 12, 1969, entitled Arithmetic and Logic Unit; the construction of the CPU as a whole may take substantially the form disclosed in the co-pending application of Edward D. Finnegan, L. Roy Harper, Nicholas S. Mitrofanoff, and Allen C. Slutman, Ser. No. 57,920, filed July 24, 1970, entitled Central Processing Unit; and the I/O channel 76 may take the form disclosed in the co-pending application of William H. Bunker, John W. Kerr, Nicholas S. Mitrofanoff, and Kent W. Swearingen, Ser. No. 52,488, filed July 6, 1970, entitled Input/Output Channel.

Advantageously, the provision of the local store registers P1–IAR, P1–ARR, P1–XR1, P1–XR2, and P1–PSR for program level 1 and the similar local store registers for program level 2, and the hardware control of both their use and selection, plus the manual controls for the two program levels, in lieu of certain parts of core storage set aside by means of programming, provide a simpler, lower cost, and improved performance system than if these same functions were provided by software or programming.

What is claimed is:

1. A programmed data processing apparatus comprising
an addressable data storage means,
a central processing unit,
one or more I/O devices connected with said central processing unit for receiving data from or supplying data to said central processing unit,
means for operating said central processing unit in first and second different independent program levels and including a toggled two-condition switch device for activating one program level in one condition of the switch device and for activating the other program level in the other condition of said switch device,
a local store register for each of said program levels which is separate from said addressable data storage means and with which the central processing unit operates in the respective program level, and
means under control of said I/O devices for automatically toggling and changing condition of said switch device from a first switching condition to a second switching condition when one of said I/O devices is busy so as to change from said first program level to said second program level and for automatically again toggling and changing the condition of said switch device back again from its said second switching condition to its first switching condition when one of said I/O devices is busy so as to return from said second program level to said first program level.

2. A programmed data-processing apparatus as set forth in claim 1, said local store register for each of said program levels constituting an instruction address register containing the address in said addressable data storage means of an instruction which is being executed.

3. A programmed data-processing apparatus as set forth in claim 1, said local store register for each of said program levels including an address recall register for containing the address in said addressable data storage means to or from which a branch is made.

4. A programmed data-processing apparatus as set forth in claim 1, said local store register for each of said program levels constituting an indexing register for containing a value to be added to a basic value to develop an address for said addressable data storage means.

5. A programmed data-processing apparatus as set forth in claim 1 which includes a condition register for storing indicators of testable instruction results, said local store register for each of said program levels constituting a program status register for retaining and restoring the value of said condition register for each program level.

6. A programmed data-processing apparatus as set forth in claim 1, said switch device being responsive to the existence of a halt instruction in the program instruction stream of the processing apparatus for changing program levels.

7. A programmed data-processing apparatus as set forth in claim 1, said switch device being responsive to a signal from one of said I/O devices that it cannot accept a start I/O instruction.

8. A programmed data-processing apparatus as set forth in claim 1, said switch device being responsive to an advance program level instruction.

9. A programmed data processing apparatus comprising:

an addressable data storage means, a central processing unit, one or more I/O devices connected with said central processing unit for receiving data from or supplying data to said central processing unit, means of operating said central processing unit in a plurality of different program levels and including switching means for switching from one program level to another, a manually operated interrupt means for initiating a change in either one of the two program levels, and means including a manually operated control switch for preselecting the program level and the I/O device which shall be used on a change in program initiated by said interrupt means.

10. A programmed data processing apparatus as set forth in claim 9 and including document card reading means and means for keying data into said data processing apparatus optionally selectable by said manually operated control switch.

11. A programmed data processing apparatus as set forth in claim 9 and including a visual indicator connected with said central processing unit for indicating the status of the data processing apparatus when said manually operable switch is moved to one of its switching positions.

* * * * *